Jan. 19, 1971  R. L. IGNELL  3,555,652
ASSEMBLING APPARATUS FOR MAKING CONTAINERS
Filed June 25, 1968  11 Sheets-Sheet 4

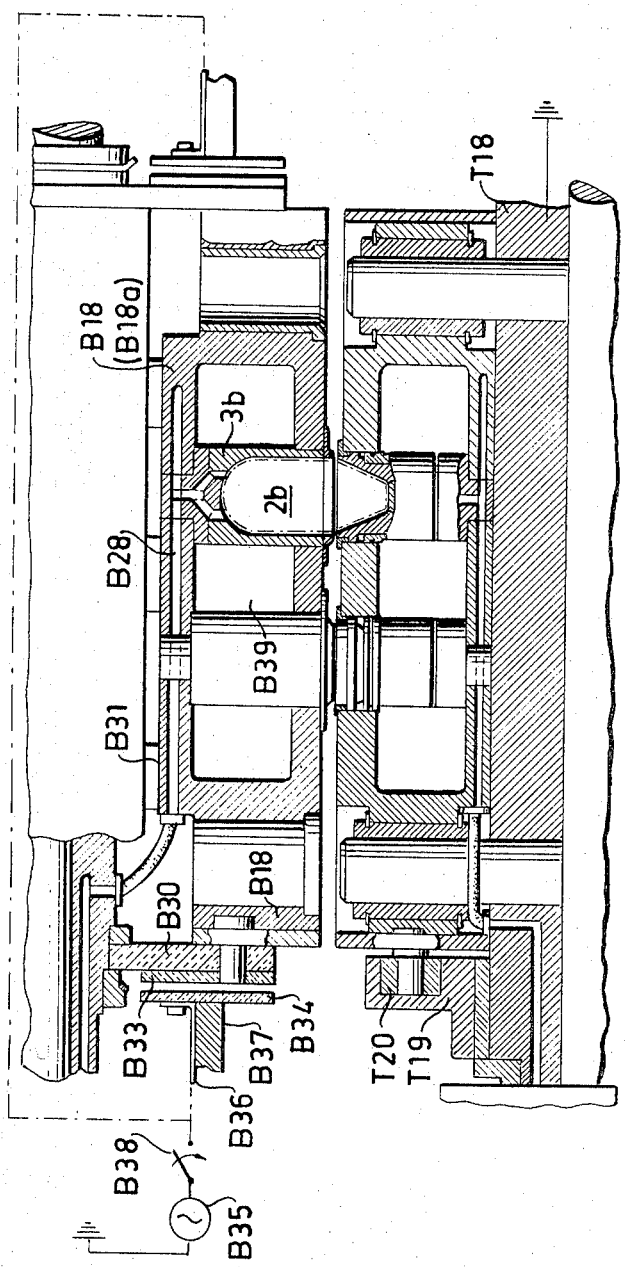

Jan. 19, 1971  R. L. IGNELL  3,555,652
ASSEMBLING APPARATUS FOR MAKING CONTAINERS
Filed June 25, 1968  11 Sheets-Sheet 10

Jan. 19, 1971 R. L. IGNELL 3,555,652
ASSEMBLING APPARATUS FOR MAKING CONTAINERS
Filed June 25, 1968 11 Sheets-Sheet 11

INVENTOR
Rolf Lennart Ignell
By
Pierce, Schiffler & Parker
Attorneys

United States Patent Office 3,555,652
Patented Jan. 19, 1971

3,555,652
ASSEMBLING APPARATUS FOR MAKING CONTAINERS
Rolf Lennart Ignell, Lund, Sweden, assignor to Sobrefina SA, Fribourg, Switzerland, a company of Sweden
Continuation-in-part of abandoned application Ser. No. 584,390, Oct. 5, 1966. This application June 25, 1968, Ser. No. 745,072
Claims priority, application Sweden, Oct. 8, 1965, 13,103/65; May 6, 1966, 6,233/66
Int. Cl. B23p *19/04*
U.S. Cl. 29—208    26 Claims

ABSTRACT OF THE DISCLOSURE

Apparatus for manufacturing containers in which a blank of plastic material is given the desired shape and is then inserted into a supporting sleeve. The apparatus also provides for the formation of two separate plastic parts which are welded together before insertion in the sleeve and further provides for continuous multiple automatic steps for forming pluralities of each of the plastic parts, the welding thereof and the insertion thereof in a plurality of sleeves.

---

This invention relates to an apparatus for the manufacture of packaging containers comprising an inner liner of a plastic material and a comparatively stiff outer sleeve surrounding the liner and is a continuation-in-part of my copending U.S. patent application Ser. No. 584,390, filed Oct. 5, 1966, now abandoned.

The liner may be comprised of two thin-walled hollow bodies welded together, prior to insertion into the outer sleeve, to form the lower and upper parts of a bottle-shaped container adapted to be closed by a plug or cap, or alternatively the liner may consist of an essentially open top cylinder which is inserted into the outer sleeve, and a cap thereafter applied to close the top of the liner after it has been filled with its contents.

In recent years, the modern packaging technique has developed a plurality of package types intended to replace the conventional packagings made of glass and sheet metal. Of these new types the majority are made of plastics and manufactured by injection moulding, blowing, deep drawing, extrusion or by combinations of these processes.

Plastic material, normally, shows a number of properties desirable for packaging material and can in most cases also be heat sealed, moulded and worked to the shape desired. However, plastic material still is relatively expensive compared with materials such as paper, glass and sheet metal. For this reason, the packages are desired to have thin walls which, in spite of their small thickness are sufficiently strong and stable.

One method of moulding plastics which in this connection has proved advantageous, is by deep drawing flat plastic material. The Swedish patent application 10,456/64, for example, discloses a bottle made of plastics which comprises a two-part liner composed of two hollow bodies welded together and which can be manufactured by deep drawing or, as this method also is called, vacuum forming in using plastic foils as starting material. The hollow bodies are provided along their edge zones with flanges, which are mounted and sealed by welding to one another in such a manner that one container body is obtained. For stiffening and supporting the thin body walls, the container body was inserted in a cylindrical supporting sleeve so that a rigid package container or bottle was obtained.

For effecting a satisfactory welded joint of two thermoplastic materials, the materials are desired to be heated prior to the welding operation. This is of particular importance in connection with high-frequency welding of materials having such a low dissipation factor (Tg $\delta$) at room temperature, that no welding at all is effected. Rigid polyvinyl chloride, for example, which at present is considered the most suitable material for packing beverages, usually must be heated to between 50° C. and 60° C. to become adapted for welding. When moulding hollow bodies by deep drawing from a thermoplastic web, the material is plasticized during the moulding operation, at the latest, but preferably prior to said operation. After their moulding, the hollow bodies still maintain a relatively high temperature which, however, rapidly falls due to the influence of the ambient. It is, therefore, desired to carry out the welding operation immediately subsequent to the moulding operation, i.e. whilst the moulded bodies still have a relatively high temperature. In the conventional arrangements, this desire could not be realized, because in said arrangements the moulding and welding operations were carried out at two separate stations, which resulted in time loss and cooling of the hollow bodies to be welded. It is, therefore, one object of the present invention to produce an arrangement wherein the said time waste is reduced to a minimum.

A further requirement is very high precision in joining together the two parts of the liner. It is, of course, possible to place the moulded hollow bodies in special holders adapted with high precision to orient the hollow bodies to be welded together. This, however, would complicate the machine considerably, for natural reasons. Therefore, the invention has as a further object to eliminate the requirement of such special holders.

One aspect of the invention is characterized in that the moulding boxes, in the edge zone for the moulding cavity in question, are provided with welding means which, subsequent to the moulding of the material introduced into the moulding cavities are adapted to be combined together with the moulded hollow bodies and between themselves to press together the edge zones of the hollow bodies, in such a manner, that the openings of the hollow bodies are united along their edge zones whilst still being within or in connection to their respective moulding cavities.

In a preferred embodiment of the invention, a plurality of members known per se have been utilized. At least the one moulding box, for example, is arranged to co-operate with a mandrel adapted to clamp a plastic foil along the edge of the opening of the moulding cavity associated with the moulding box and to press the central portion of the material into the cavity. For facilitating the moulding, the mandrel preferably is provided with channels opening on its outer surface, through which channels a pressure medium can be introduced into the moulding cavity in order by pressure action to cause a material foil which is located between the mandrel and the moulding cavity, plasticized by heating and intended to be worked by moulding, to join closely, while stretching, with the surface of the moulding cavity and thereby be given a shape defined by the cavity.

However, when using usual plastic materials it was found, that the aforesaid generally known moulding tools give rise to considerable friction between the mandrel and the plastic material. For the material thickness desired in connection with the invention, this friction has proved too great, as it involved the risk of damage to the thin material. This is particularly the case with varnished material which, when being heated, shows the risk of sticking to the plunger. According to a development of the invention, however, this risk has been reduced substantially. This is achieved in that the mandrel is provided with blow-off holes for the supply of hot air to the area between the front surface of the mandrel and the material foil. In this way, the friction between the mandrel and the material foil is substantially reduced, because the hot air serves as "lubricant."

The package containers to be manufactured by the arrangement according to the invention are intended, for example, for the packing of beer and other aerated beverages when the liner has a bottle-like configuration. Previously, these beverages were packed in conventional glass bottles or sheet metal cans. A substantial expense factor involved therein is the transport of empty bottles or cans from the place of manufacture to the place of application, for example, to a brewery where the bottles or cans are to be filled. By replacing the conventional materials, glass and sheet metal, with plastics, however, the manufacture can be transferred to the place of application. This involves, however, the desire, and practically the condition, that the machine for the manufacture of the packing containers can be operated by technicians without special training, and that the machine requires only little space. It was, therefore, one object of the development of the arrangement according to the invention to meet these wishes and requirements. A plurality of the characterizing features of the invention mirrors these endeavors. Thus, one embodiment of the invention is characterized by an intermittently rotatable first revolving means comprising a plurality of moulding boxes arranged like arms on a preferably four-armed cross, each of the moulding boxes including at least one moulding cavity having its central axis directed to the axis of rotation of the revolving means, the said revolving means being adapted to advance in proper order each of the moulding boxes with the moulding cavities therein to a position directly in front of the mandrel.

In order to increase the capacity of the arrangement, each of the moulding boxes preferably comprises a group of moulding cavities, all of said groups being identical, with respect to the arrangement of the moulding cavities comprised in the group, and a group of mandrels being provided wherein the mandrels are arranged in the same manner as the moulding cavities.

In accordance with the aforesaid effort in obtaining a compact machine, an additional development of the invention is further characterized by two revolving means which, in principle, are identical but rotate in different directions, the said means being arranged with their respective shafts in parallel and of such relative placement, that the central axis of the moulding cavities or groups of moulding cavities comprised therein can be made to coincide, at least one of said revolving means being provided with members by which hollow bodies moved directly in front of each other and moulded in the moulding cavities can be connected to be welded together.

The invention, furthermore, discloses a solution of the problem, within a highly compact arrangement to provide the container body with a sleeve for supporting and stiffening the casing wall of said body. For this purpose, a first revolving means is provided to form the top portions of the container bodies, and a second revolving means is provided to form the casing and the bottom portions of the container bodies. The said arrangement is characterized by members adapted from the moulding cavities in the said second revolving means the bottom portions moulded and welded together with the top portions, whilst the moulding cavities in both of the revolving means are caused to separate from one another, the first revolving means being adapted to retain the top portions moulded therein and thereby also to receive the bottom portions welded together with the top portions, and to transport forward the manufactured container bodies. The arrangement further is characterized by holders for tubular sleeves, which holders are adapted to co-operate with the said first revolving means, in such a manner, that the container bodies retained by the revolving means and turned forward to a position directly in front of the said sleeve holder are inserted into sleeves moved directly in front of the container bodies, in that both the moulding box receiving the container bodies and the holders are adapted to be moved relative to one another.

The present invention also provides for a slight modification of the first and second revolving means to adapt the apparatus for production of a packaging container wherein the thin-walled plastic liner to be moulded is not in two parts which are welded together but rather consists of one moulded part having an essentially cylindrical configuration and which is open at one end to receive a cap after being filled, the one-piece liner being inserted into the outer and relatively stiff sleeve. Such a packaging container is illustrated, for example, in U.S. Pat. No. 3,355,080 granted Nov. 28, 1967. This modification resides in the substitution of a simple gripping means on the first revolving means for the means which mould the top portion of the two-part type container body, this gripping means being adapted to transfer the one-piece moulded container bodies to and for insertion into the outer sleeve.

Additional objects and advantages as well as characterizing features of the arrangement according to the invention will be apparent from the following description wherein reference is made to the accompanying drawings.

FIG. 10 shows a horizontal section through the moulding boxes in their position for welding together the hollow bodies.

Figure 1:
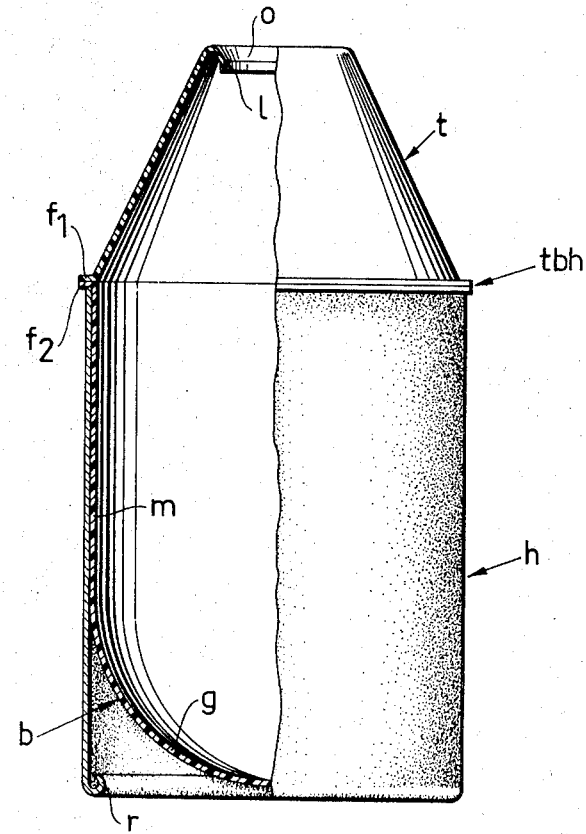
FIG. 1 shows a package container of the type which the apparatus according to the invention is intended to produce.

In FIG. 1 the bottle-like package container, as it is intended to be manufactured by the arrangement according to the invention, is designated by $tbh$. The package container, or the bottle as it will be called in the following, comprises three parts, viz a top portion $t$, a bottom portion $b$, and a sleeve $h$. The top portion $t$ and the bottom portion $b$ are two hollow bodies which are united along their edge zones. For obtaining a safe joint, each of the portions has been provided during the moulding with a external straight edge flange $f_1$ and $f_2$ respectively. The top portion $t$ and the bottom portion $b$ together form a container body $tb$ with a bottom end wall $g$, a casing $m$ and a top or neck portion $t$ with an opening $o$, the latter being punched out in connection with the manufacture of the top portion *t*. In the area for the opening *o* there is an inwardly turned lip *l* which, together with a suitably shaped cap (not shown) defines a self-sealing closure.

The wall thickness of the container body *tb* is adjusted to render, upon the ovepressure possibly occurring in beer and aerated water bottles, in the curved end wall *g* a tensile stress which does not exceed the value permissible for the material. At the stress distribution as it is given in a container of the type described, the peripheral tensile stress in the casing *m* will be substantially twice as high as the tensile stress in the end wall *g*. Consequently, the casing wall constitutes a critical zone which is exposed to a tensile stress higher than the highest permissible, when the tensile stress in the end wall reaches its highest permissible value. The supporting sleeve *h* however, serves as a thrust which relieves the casing wall *m* and thereby renders it possible that the casing *m* of the container body *tb* is given the same wall thickness as it is required in the end wall *g*, thereby reducing the consumption of the relatively expensive plastic material to a minimum. The sleeve *h* also serves as a base for the container body *tb* and extends on to the same level as the lowest portion of the end wall *g* or past said portion. The lower edge *r* of the sleeve is rolled inwards as shown in the figure.

Figure 2:
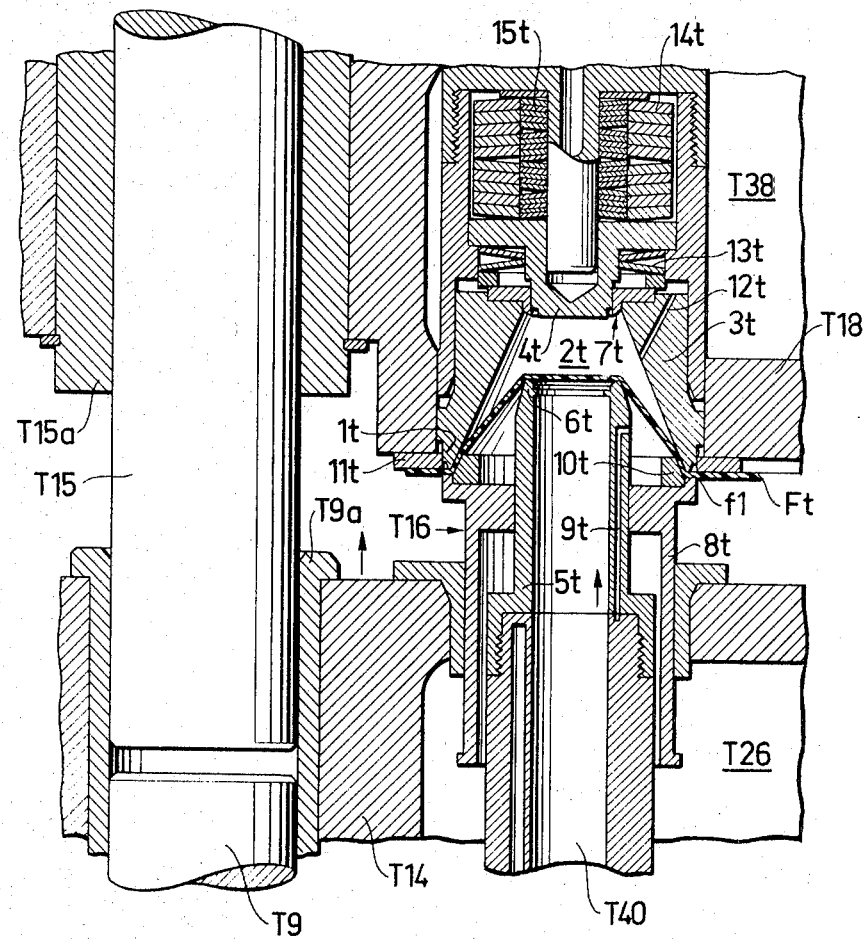
FIG. 2 shows in a somewhat simplified manner a moulding tool for manufacturing the top portion of the package container.

In FIG. 2 is shown how the bottle top *t* can be manufactured. For making the essential features appear more clearly, only the most essential details are shown in the figure while other details are omitted. F*t* designates a web of plastic material, for example polyvinyl chloride, which has been plasticized by heating. In the moment of the moulding operation as shown in the figure, a circular piece of the plastic material F*t* has been clamped between a moulding device 3*t* and a clamping punch 8*t* and a clamping ring 10*t*. The portion of the plastic material which is supposed to form the flange $f_1$, substantially has been formed already, while the portion intended to form the straight portion of the bottle top is just going to be drawn.

The external outline of the botle top is determined by the moulding device 3*t* which has a moulding cavity 2*t*. The said moulding device 3*t* is comprised in a moulding box T18 and may be said to constitute an integrated part thereof. The term moulding box may be understood both as a simple moulding device, like the detail 3*t*, and as a tool of greater dimensions including a number of moulding devices 3*t* and a box enclosing the same.

The complete moulding of the bottle top is effected by the influence of three factors, namely, by an overpressure between the plastic material foil and the clamping punch, which overpressure is obtained via a compressed air line 9*t*, further by a vacuum in the moulding cavity 2*t* above the material foil, which vacuum is obtained via vacuum lines 12*t*, and, thirdly, by a plunger device 5*t* which is arranged slidably in the clamping punch 8*t* and during the moulding is moved upwards in the direction of the arrow. The said members 5*t* and 8*t* together will, somewhat improperly, be defined in the following as mandrel which in this connection is given the designation T16. The lip *l*, FIG. 1, is given its final shape when upper portion 6*t*, of the plunger 5*t* is pressed against the upper wall portion 7*t* of the moulding cavity, thereby giving the lip *l* the desired shape at the same time as the punch 4*t* by the compression of a first spring 13*t* is moved a small distance in relation to the moulding device 3*t*, so that a round portion is punched out of the plastic foil. The said relative movement between the punch 4*t* and the moulding device 3*t* is effected when moulding device 3*t* by the clamping punch is caused to slide a corresponding distance upwards in the box T18. At the same time as hereby by the punching of the said round portion, an opening is formed in the bottle, the plastic material is cut off between the clamping punch 8*t* and the clamping ring 11*t*, which serves as a cutting tool. The round punched out piece is removed via a channel T40. 14*t* and 15*t* designate two "securing" strong spring packs.

The lower portion 1*t* of the moulding device 3*t*, i.e., the edge of the moulding cavity 2*t*, is designed such that it can press mould the flange $f_1$ which, in order to improve the junction with the flange $f_2$ of the bottle portion, FIG. 1, has been given a relatively complicated profile. Furthermore, the portion 1*t* defines a welding electrode which, thus, constitutes an integrated part of the moulding device 3*t* and the moulding box 18. The said welding electrode 1*t* is grounded (connected to earth) via the moulding box T18.

Figure 3:
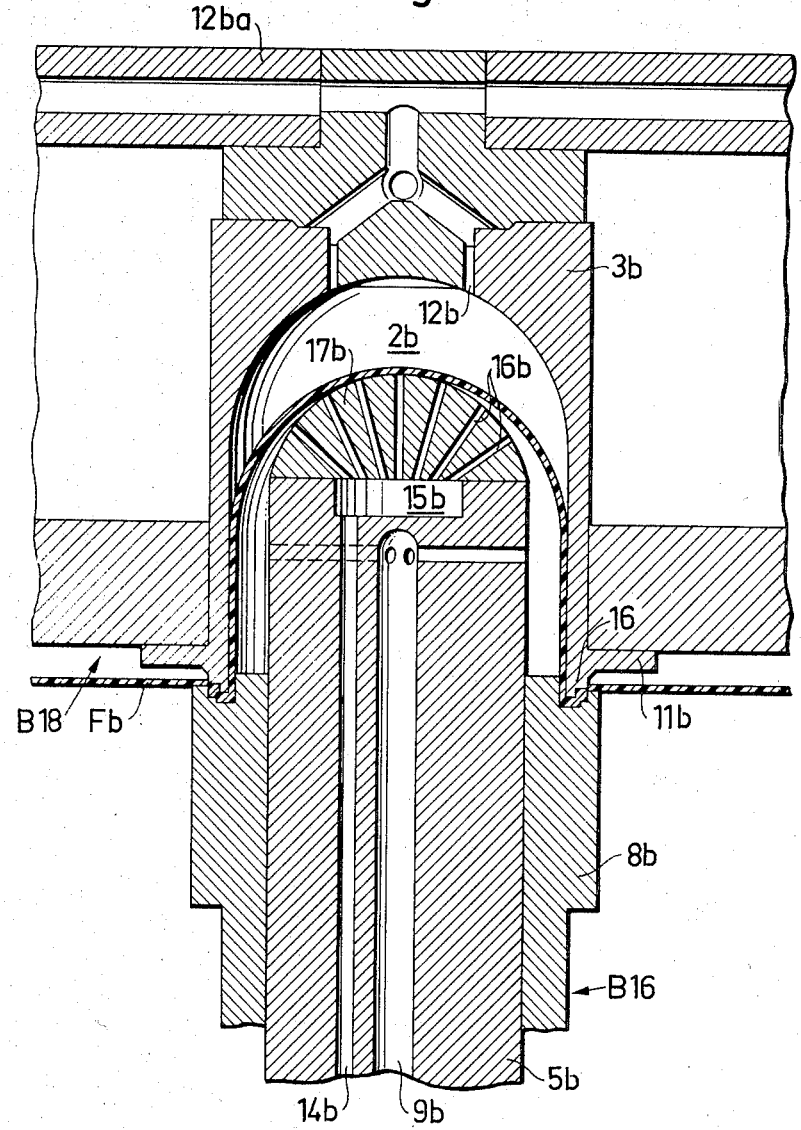
FIG. 3 shows, also in a somewhat simplified manner, a moulding tool for the manufacture of the bottom portion of the package container.

The bottom moulding tools shown in FIG. 3 are designed, in principle, like the top moulding tools. The details corresponding to those in FIG. 2, therefore, are given the same designation. The letter *t*, however, is exchanged against the letter *b*. Thus, 3*b* designates a moulding device comprised as a part in a moulding box B18 and having a moulding cavity 2*b* of the same shape as the bottom portion *b* of the container body *tb* in FIG. 1. The edge of the moulding cavity 2*b* is designed as a welding electrode which, however, is not grounded, contrary to what is the case with the top moulding tool. The moulding box B18, instead, is insulated from the ground and in capacitive connection with a high-frequency generator (not shown). The moulding device 3*b* is provided with air passages 12*b* connected to a main line 12*b*$_a$ and with a cutting ring 11*b* against which the plastic material F*b* is adapted to be separated in a manner as appears from the enlarged detail in the figure.

The mandrel B16 comprises a plunger 5*b* and a clamping punch 8*b*, the plunger being mounted slidably in the said punch. The moulding, as in the case of the top moulding tool, is carried out by a combination of pressure and vacuum drawing and by the simultaneous deep drawing of the plunger 5*b*. For the pressure required a compressed air channel 9*b* is provided which branches to a plurality of passages opening into a groove in the outer surface of the plunger. Thus, through the channel 9*b* air is supplied which by active pressure in the final phase presses the foil against the walls of the moulding cavity.

The plunger is provided with an additional channel 14*b* which is connected to a hot air source and supplies hot air via a distribution chamber 15*b* and compression hole lines 16*b* to the front portion 17*b* of the plunger 5*b*. Hereby is formed a thin layer of hot air between the foil and the front portion of the plunger, which air serves as a lubricant and substantially reduces the friction between the plunger and the foil. As a result thereof, the plastic can be drawn to a greater depth and to thinner wall thicknesses than it otherwise would be possible.

Figure 4:
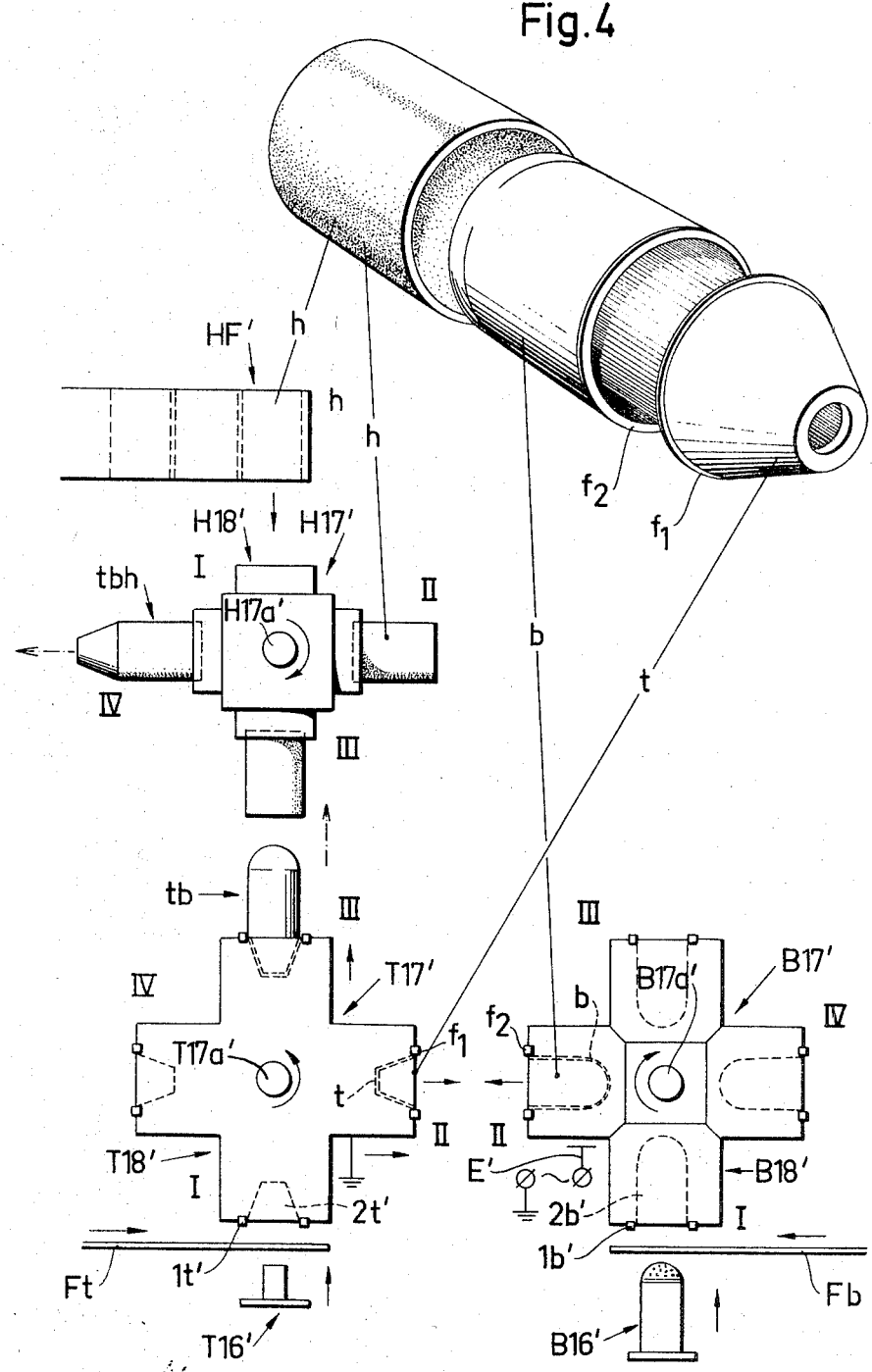
FIG. 4 shows in a schematic manner the different components of the package container, and how the different operation steps are intended to be coordinated in the arrangement according to the invention.

FIG. 4 shows in a schematic manner a machine wherein the afore-described moulding tools are intended to be comprised. The machine can be said to include the main components as follows: three revolving crosses T17', B17', and H17', two mandrels T16' and B16' and a sleeve feeder HF'. The designation prime (') means that the details in question are shown only in a schematic manner and will be shown more precisely in the following drawing figures.

The revolving cross T17', together with the mandrel T16', is arranged to form the top portion *t* of the container bodies, the cross B17' together with the mandrel B16' the bottom portion *b*, and the cross H17' is arranged to turn the sleeves *h* forward for being applied on the casing portions of the container bodies *tb* and for the removal of the completed package containers or bottles *tbh*. Each of the said crosses is intermittently rotatable about its axis T17*a*', B17*a*' and H17*a*', respectively. Each rotation step corresponds to a quarter of a revolution, the directions of rotation being indicated by the rotation arrows.

The entire machine may be said to be able to assume four positions I, II, III and IV.

Each arm in the crosses T17' and B17' comprises a moulding box T18' and B18' respectively with one or several moulding cavities $2t'$ ($2b'$) which comprise a welding member $1t'$ ($1b'$) defining the edge of the moulding cavities. For reasons of simplicity, it is assumed in the following that in the arrangement according to FIG. 4 every moulding box has only one moulding cavity.

In position I, a moulding box T18' and a moulding box B18' with empty moulding cavities $2t'$ and $2b'$ have been turned forward in counter-clockwise and clockwise direction respectively into positions directly in front of the mandrels T16' and B16' respectively. The plastic foil materials $Ft$ and $Fb$ have been advanced one step, so that a portion of the material webs is located between the mandrels and the moulding cavities. The means for feeding the plastic materials are not shown in the figure, but may be conventional step feeding means.

In the beginning phase of position I a sleeve $h$ has been advanced by the sleeve feeder HF' to a position directly in front of an empty sleeve holder H18' which has been turned forward one step in clockwise direction.

The treatment in station I with respect to the molding of the top is commenced in that a piece of the material $Ft$ is clamped between the clamping plunge of the mandrel T16', FIG. 2, and the welding electrode $1t'$ on the moulding box T18'. In the same way, a piece of the material $Fb$ is clamped between the clamping plunge on the mandrel B16', FIG. 3, and the welding electrode $1b'$. Hereafter, the two hollow bodies are formed in the manner as set forth with reference to FIGS. 2 and 3, i.e. by a combination of vacuum, pressing and drawing. When the moulding is completed, the mandrels are returned whilst the moulded hollow bodies remain in their respective moulding cavities. During the moulding of the hollow bodies, a sleeve $h$ is moved down in the sleeve holder H18' by a means not shown. The sleeve is retained in the sleeve holder during the continued process by frictional holding.

At the same time when in station I the hollow bodies are being formed and a sleeve is introduced into the process, the treatment is continued in the other stations, as will appear from the following.

Subsequent to the completed treatment in station I and in the other stations, the crosses T17', B17' and H17' are turned forward one step, i.e. one quarter of a revolution, in the directions of the arrows, so that the arms containing the hollow bodies moulded in station I and the introduced sleeve respectively are caused to assume the starting positions for the treatment in station II.

In station II the newly formed hollow bodies $t$ and $b$ have been placed directly in front of each other, so that the central axis of the hollow bodies coincide. The sleeve $h$ has been turned to an intermediate position in which it is not exposed to any type of influence.

In station II the two hollow bodies are to be united along their edge zones by welding together the flanges $f_1$ and $f_2$. According to the invention, the uniting of the hollow bodies is to be effected in such a manner, that the welding electrodes $1t'$ and $1b'$, together with the moulded hollow bodies, are adapted to be moved together and between themselves to press together the edge zones of the hollow bodies (the flanges $f_1$ and $f_2$), in such a manner, that the openings of the hollow bodies are made to coincide. Hereby the hollow bodies can be united along their edge zones while they still are within or in connection with their respective moulding cavities. The movement of the two hollow bodies relative one to another is only indicated in FIG. 4 by dashed arrows, because several alternative ways can be imagined how the said movement is carried out in practice. Among alternative solutions the following may be mentioned:

(a) Only the welding electrodes, together with the hollow bodies, are moved towards each other, either by moving the electrode $1t'$ or the electrode $1b'$ or both electrodes towards each other. According to this solution of the problem, thus, the electrodes are to be mounted on rods of some type, by which rods the electrodes are pushed out from the moulding boxes. The solution is imaginable, but such rods or like additional members result in a substantial complication of the arrangement. For this reason, this solution has not been utilized in the embodiment to be described in a greater detail in the following.

(b) The crosses in their entirety are moved towards each other, preferably by moving the cross B17'. However, this is no ideal solution either, because also the mandrels B16' and the material web $Fb$ must be taken along in a corresponding way, and because of the difficulties in moving masses of such a size within the short time interval available.

(c) The moulding boxes T18' and B18' are displaced towards each other, together with the welding electrodes $1t'$ and $1b'$ respectively and with the hollow bodies in the moulding cavities. As this solution offers many advantages, it was preferred in the following embodiment of the invention. The moulding boxes B18' are mounted fixed in the revolving cross B17' while the moulding boxes T18' are mounted such, that they are slidably displaceable in the cross T17', i.e. they can be moved in a direction perpendicular to the shaft T17$a'$. The moulding boxes T18' and, thereby, also the welding electrodes $1t'$ are grounded, while the moulding boxes B18' and, thereby, the welding electrodes $1b'$ are insulated from each other as well as from earth. Furthermore, the electrodes $1b'$ via the moulding boxes and a capacitive transfer can be connected to a high-frequency generator which is adapted to deliver to the electrodes a high-frequency voltage.

The movement of the moulding box T18' in the direction to the moulding box B18' is commenced preferably already during the step of the box from position I to position II. The way in which this first moment of the displacement is intended to be carried out, is described in the following. When the turning movement of the cross is completed, the moulding box T18' (position II) is thereby already displaced a considerable distance towards the box B18' (position II). This has not been indicated in FIG. 4, but is here assumed to be the case, with reference to the following. The final uniting from this "starting position for uniting" is effected after the cross B17' was brought to a standstill.

When, thus, the welding electrodes were caused between themselves to press together the flanges $f_1$ and $f_2$, the hollow bodies still being in their respective moulding cavities, the high-frequency voltage is connected. Owing to the dielectric losses in the plastic material between the electrodes $1t'$ and $1b'$, the flanges $f_1$ and $f_2$ are molten and thereby welded together.

Subsequent to the completed welding the box T18' is returned. At the same time the bottom portion $b$ is ejected out of its moulding cavity. The said ejection preferably is intended to be effected in that the pipe $12b_a$, FIG. 3, in position II is connected to a pressure source instead of to a vacuum source as was the case in position I. Due to the fact, that the separation of the tools and the ejection of the bottom portion from its moulding cavity are effected simultaneously, the container body $tb$ welded together is transferred as an entirety to the cross T17'. For safely retaining the top portion $t$ in its moulding cavity, and thereby also the entire container body $tb$, the air passages $12t$, FIG. 2 still is preferably connected to a vacuum source whereby the container body is secured by suction in the top moulding cavity.

When the bottom portion is completely drawn and ejected from its moulding cavity, the treatment in position II can be said to be finished. It is to be understood that, in parallel with this treatment, new hollow bodies were moulded in position I, and also in the remaining stations steps were taken in accordance with what is described in the following.

Now a further step is taken to position III. In this position, and also in the next one, the bottom moulding box B18' occupies a non-operative position. The top moulding box, however, which receives the container body $tb$, has been turned forward to a position in which the central axis of the container body $tb$ coincides with the central axis of a sleeve h fed on in its holder H18'. When the revolving cross has been brought to a standstill in station III, the container body tb is inserted into the sleeve, which insertion is effected by an upward movement of the moulding box T18'. The casing portion m of the container body tb, FIG. 1, being inserted entirely in the sleeve h, the line 12t, FIG. 2, is connected to a compressed air source whereby the container body tb is ejected from the top moulding cavity 2t'. The bottle tbh now completed is taken over by the sleeve holder H18' which from position III (the box T18' is returned before) turns the bottle tbh to position IV in which it is ejected by compressed air from the sleeve holder H18'. Subsequent to a further turning of the revolving cross a working cycle is completed.

Figure 5:
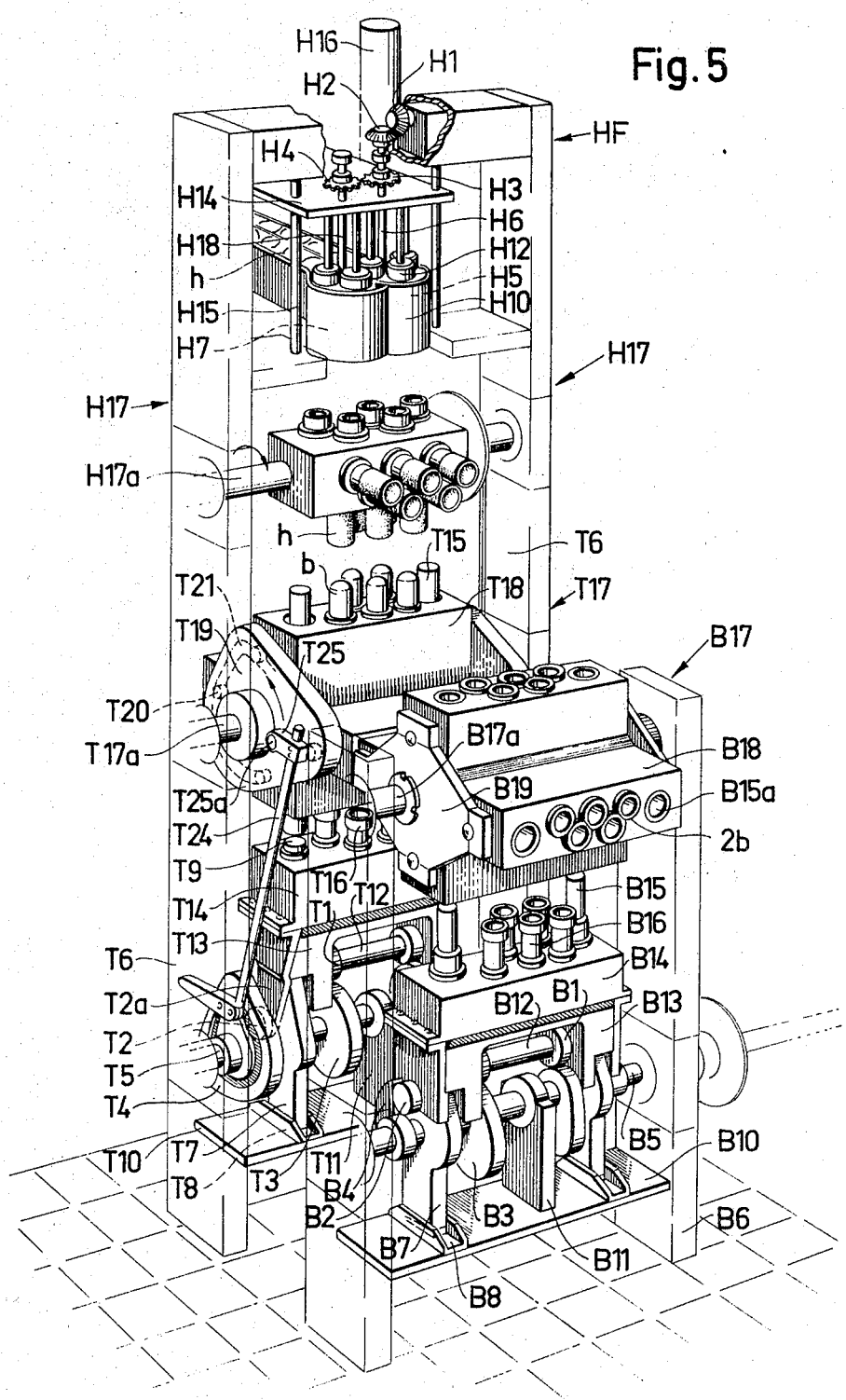
FIG. 5 shows a view of a machine according to an embodiment of the invention, whereof certain means are omitted for making the essential parts appear more clearly.

FIG. 5 shows in a greater detail how the machine shown schematically in FIG. 4 is intended to be constructed according to the preferred embodiment briefly disclosed above in item (c). However, also in FIG. 5 several details are omitted, for example certain drive means, means for advancing the plastic material webs and for receiving as well as discharging waste material. Furthermore, certain details are shown by "ghost lines" in order not to conceal means located behind. It is, however, to be understood that the deviations from a fully accurate illustration are made only in order to elucidate the principles of the machine. In the description of the machine shown in a perspective view in FIG. 5 and of its mode of operation, reference will be made also to the remaining drawing figures.

In FIG. 5 the central field is dominated by the two revolving crosses T17 and B17 which comprise means for moulding the top and bottom portions respectively of the container body. Below the revolving crosses two sets of mandrels T16 and B16 can be seen. Each of said sets includes five mandrels. In the same way, every arm in the arm cross shows the same number of welding electrodes 1t and moulding cavities 2t, FIG. 2 and 1b and 2b, FIG. 3 respectively.

In the construction, the mandrels and moulding cavities have been arranged such, that the amounts of waste material will be the smallest possible.

The lower parts of the apparatus according to FIG. 5 are dominated by different motion means, particularly such adapted to impart to the mandrels the necessary impulses for upward and downward movements.

The upper part of the apparatus according to FIG. 5 shows the "sleeve applying cross" H17 and the sleeve feeding means HF.

Figure 6:
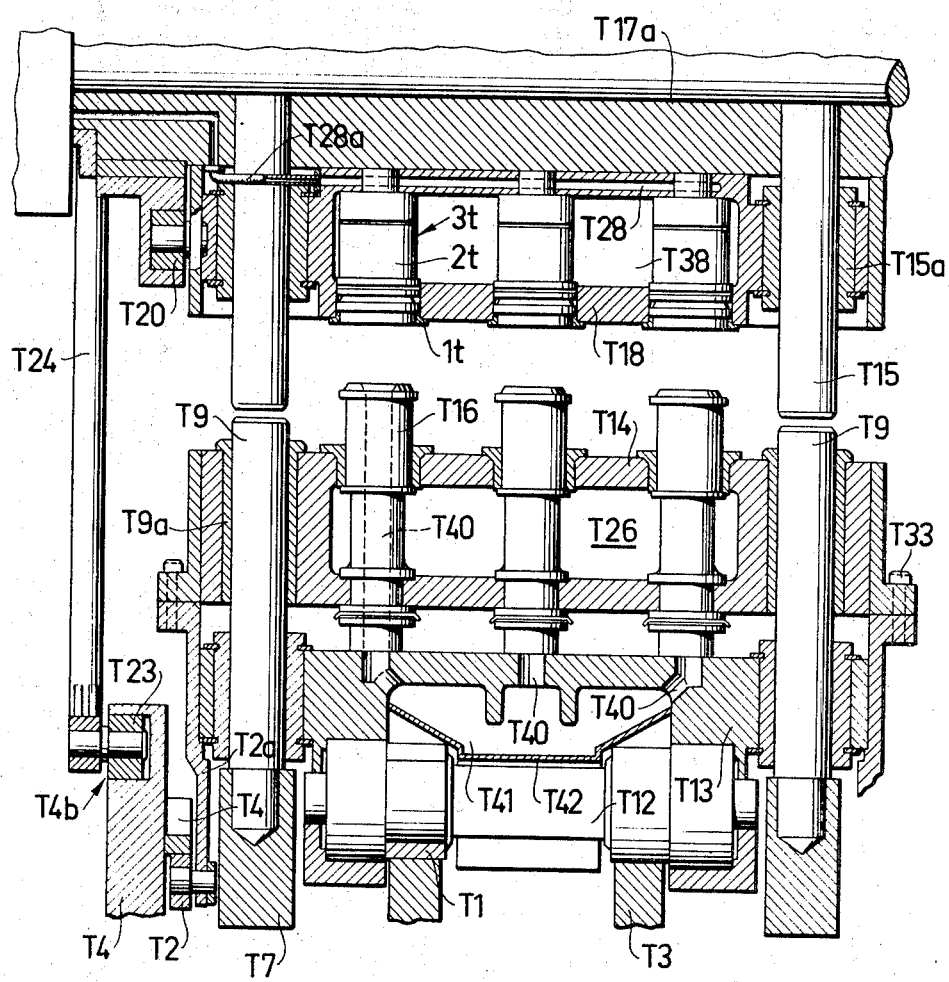
FIG. 6 shows a vertical section through members for moulding the top portions.

The top moulding means, as mentioned, comprise five mandrels T16 of the type the design of which was shown, in principle, in FIG. 2. The mandrels are mounted in a hydraulic box T14. FIG. 6, comprising a chamber T26 containing hydraulic liquid. The hydraulic box T14 is mounted slidably on stationary pillars T9. T9a designates bushings about the pillars T9. The upward movement of the mandrels is carried out to its greatest part by a displacement of the entire hydraulic box T14. The punching out of the web against the cutting ring 11t, FIG. 2, is effected by mechanically transferred pressure, in the moment when the plunger cams T3 arrive at their top position and the clamping members 8t arrive at their bottom position. The hydraulic pressure in the chambers T26 controls the pressing force of the clamping members against the plastic web before the cutting is effected. The contact period, and thereby the cooling period, is extended by the relatively long strokes of the holding down member whereby part of the closing and opening time of the tools can be utilized in an effective way. Due to the special design of the plungers 5t in their lower portions, during each working cycle the hydraulic liquid closest to the plungers is pumped out and replaced by a new and cooler liquid. The hydraulic chamber is provided with a conduit (not shown) adapted to be connected to a pressure source. Channels T40, FIG. 6, extending through the mandrels T16 open into a space T41 below the member T13. In the space T41 a "slide" T42 is arranged for the rounds punched out, which rounds in this way are removed from the machine.

The hydraulic box T14 rests on the member T13 which in the following is called a beam. Said beam T13, and thereby also the hydraulic box T14 and the mandrels T16, are provided with means effecting the upward drive. Said means comprise two cam discs T3 mounted on a drive shaft T5. Against the cam discs T3 abut two cam rolls T1 mounted on a short shaft T12 supported in the beam T13. The drive shaft T5 is mounted in five points, located in the stand T6, in the supports T7 which also carry the pillars T9, and in a central bearing bracket T11. Both the said supports T7 and the bearing bracket T11 rest on a crossbar T10 in the main stand T6. The supports T7 are anchored by wedges T8.

The return of the hydraulic box T14, i.e., is downward movement, is effected primarily by the own weight of the box and of the beam T13. In order to ensure the said return and to increase its speed, however, certain downfeed members are associated with the said hydraulic box. Thus, to each side of the box T14 a power transfer plate T2a is connected which in its lower portions is provided with a roll T2. Cam discs mounted on the common drive shaft T5, one on each side, are designated by T4. The said cam discs have inner grooves T4a and outer grooves T4b. The roll T2 on the plate T2a is in engagement with the inner groove T4a, FIG. 9b, which due to its shape, upon the rotation of the shaft T5, is adapted during a certain moment of said rotation to move the roll T2, and thereby the hydraulic box T14 and the mandrels T16, downward.

The revolving cross T17 comprises four moulding boxes T18 which are arranged to move slidably in radial direction to the revolving shaft T17a. The said shaft is mounted in the stand T6. Each of the moulding boxes comprises five moulding devices 3t with moulding cavities 2t. The lower edge of the moulding devices which defines the opening of the moulding cavity forms the welding electrodes 1t which are constructed in the way as appears in a greater detail from FIG. 2. T28 designates a channel having a portion T28a in the form of a flexible hose. The said channel T28 is connected to the pressure or suction channels whereof one is shown in FIG. 2 and designated by 12t.

The moulding boxes T18, as mentioned, are slidable and, therefore, like the hydraulic box provided with bushings T15a sliding about stationary guide pins T15. As the guide pins T15 have the same dimensions as the pillars T9, the bushings T9a of the hydraulic box can slide over to the guide pins T15 during the upward movement of the hydraulic box and thereby effectively guide the said movement. In the position shown in FIG. 6 the cut-away moulding box is shown in its bottom position, i.e. in the position in which it abuts to the shaft T17a of the cross T17.

Each of the end walls of the moulding boxes T18 is provided with a roll T20. The said rolls T20 mounted in the end walls of the moulding boxes are arranged in a groove T21 in the surface of a cam disc T19 facing the moulding boxes. The said groove T21 is given a very specific curvature, having alternating points and leveling portions as indicated by dashed lines in FIG. 5. The cam disc T19 is mounted slidably on the shaft T17a.

Figure 8:
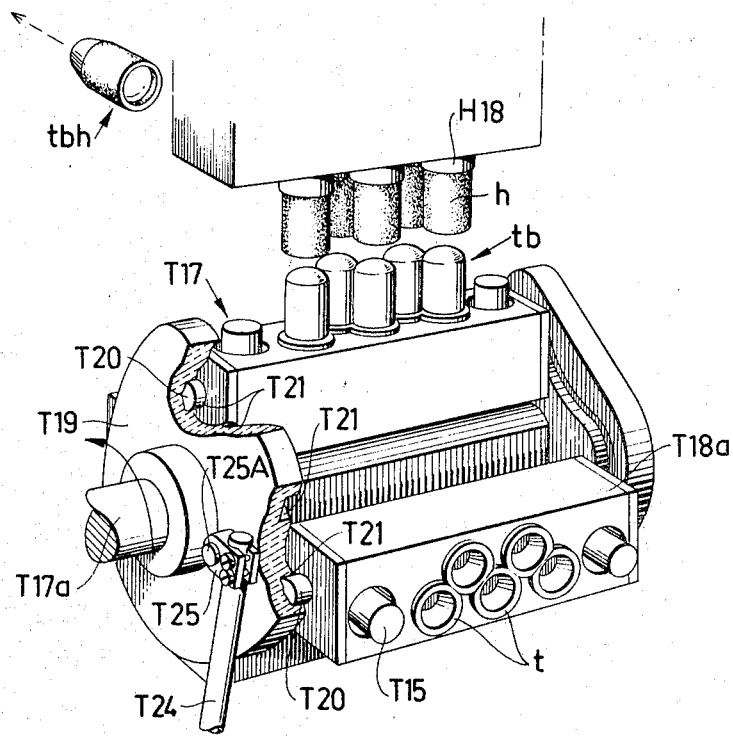
FIG. 8 shows a first revolving means adapted for moulding the top portions and, partially cut open, a first guide cam.

It appears also from FIG. 8 how the cam disc T19 is arranged in engagement with the rolls T20 of the moulding boxes T18. In the said figure a cam disc T19 is shown cut open, so that the groove T21 becomes visible in four places. It, thus, appears, clearly how the rolls T20 are intended to run in the cam groove.

FIG. 8, furthermore, shows with desired clearness the possibility of displacing the moulding boxes T18 radially in relation to the revolving shaft T17a by turning the revolving cross T17, the so-called indexing movement, which possibility is obtained by braking the cam disc T19 and designing the cam groove or guide cam T21 in a suitable way.

In this embodiment the disc T19 takes part in the indexing movement until there remains about 15° thereof. During the first 75 degrees of the movement, thus, a moulding box T18a, FIG. 8, remains in its inner position. Thereafter the rod T24 commences to draw back the disc T19 whereby the box T18a in a continuous movement is moved out to its end position, i.e. in such a manner, that the top portions $t$ are brought into contact with the bottom portions $b$. During this movement the indexing movement comes to its end.

In a corresponding manner, a second moulding box T18b with the container bodies $tb$ is moved during the indexing movement upwards against the sleeves $h$, in order to insert the bodies $tb$ in a continuous movement into the sleeves $h$ after the revolving cross has stopped. The elevation of the box T18b during the indexing, however, is relatively small as otherwise the bottoms in the container bodies $tb$ would strike against the sleeves.

In spite of the fact that the indexing movement and the entirely radial finishing movement are running continuously one into the other, the guide cams T21 together with the rolls T20 and the means rotating the shaft T17a can be said during the indexing movement to define "first motion means" adapted to impart to a moulding box T18a and hollow bodies $t$ formed therein a motional component directed radially out from the axis of the revolving cross, in order to move the hollow bodies to a starting position for being combined with the bottom portions $b$. The same first motion means also are adapted to displace a second moulding box T18b to a starting position for inserting the container bodies $tb$ into the sleeves $h$.

In view of the real conditions—referring to the continuous operation of the means—the machine also can be said to comprise "second motion means" by which the moulding boxes T18a and T18b, FIG. 8, can be displaced entirely radially in order to completely move together the hollow bodies $t$ and $b$ for being welded and, respectively, to push the container bodies $tb$ welded together into the sleeves $h$, after the said starting positions were assumed (are being passed) and the revolving cross T17 was brought to a standstill. These second motion means, like the aforementioned first motion means, comprise the cam discs T19 which in this case are adapted to perform a rotary motion corresponding to a certain smaller angle of rotation, further the rolls T20 on the end walls of the moulding boxes, and means for effecting the rotary motion. These means in their turn comprise on each side of the machine a power transmitting rod T24, an angular piece T25 rigidly connected with the said rod, which angular piece has a bearing T25a with a pin on the outside of the cam disc T19 running therein, and the moment producing means adapted to actuate the rod T24. The said moment producing means comprise the aforementioned cam groove T4b, FIG. 9a, in the cam disc T4, means for turning the cam disc T4, and a link between the rod T24 and a wheel or roll T22 running in the cam groove T4b. The said link, as appears most clearly from FIG. 9a, comprises a lever T23 having its one end fixed in the stand T6 by the pin T23b and its other end articulated at the lower end of the rod T24, the articulation being designated by T23c in FIG. 9a. The roll T22 is mounted in a bearing T23a forming the lever centre.

When the hollow bodies $t$ and $b$ are being moved together in the welding station, FIG. 10, the flanges $f_1$ and $f_2$ are pressed together between the welding electrodes $1t$ and $1b$. During the commencing phase the top moulding devices $3t$, FIG. 2, are pressed into the moulding box T18, thereby compressing the spring washers $13t$. When gradually the plastic material in the flanges is caused to melt, the springs $13t$ press back the moulding devices $3t$. As a result thereof, the plastic material in the flanges flows out, so that the flanges in their final shape are given "single" flange thicknesses. The spring washers $3t$, thus, have a double function, viz one function in the moulding station for punching the material, and a second function in the welding stations for giving the flanges their final shape.

As regards the means for moulding the bottom portions of the container bodies, the lower units, i.e. the means for controlling the mandrels B16, are constructed, in principle, in substantially the same way as the corresponding means for top moulding and are given the same designations. The letter T, however, is exchanged against the letter B. A special explanation of the construction of these details, thus, appears not necessary, and it is only referred to the figures as well as to the description of the top moulding means. Certain differences, however, are dealt with in the following.

B4 designated a cam disc having a single interal cam groove B4a with a roll B2 running therein, which roll is adapted to draw down the hydraulic box B14. Further are comprised guide pins B15 which are rigidly mounted on the hydraulic box B14. The mandrels B16 are of the type shown more precisely in FIG. 3.

The moulding boxes B18 include five moulding cavities $2b$ of the type shown in FIG. 3, which cavities can be connected via an air line B28 to a pressure or vacuum source. A portion B28a of said line is formed by a hose. The chamber B39 contains cooling liquid.

Contrary to the moulding boxes T18, the moulding boxes B18 are fixed, i.e. they cannot be moved in radial direction.

B27 designates a box beam enclosing the shaft B17a of the revolving cross B17. Between the box beam B27 and the moulding boxes B18 there are provided distance members in the form of two rings B31 of insulating material. The moulding boxes are secured to the shaft B17a by two insulating plates B30. B32 designates rivet joints serving both as a mechanical connection between the moulding boxes B18 and the insulation plates B30, and as an electrical connection between the moulding boxes and "capacitor plates" B33 arranged on the insulating plates.

The said capacitor plates B33 are intended to constitute the one coat in the "transfer condenser" for transferring the electric energy required for welding to the moulding boxes B18 in welding position. FIG. 10 shows the moulding boxes B18 and T18 in the said position. The top moulding means are grounded while the bottom moulding means are adapted to be connected to a high-frequency generator via the said capacitive transfer. B34 designates two plates defining the other coat in the "transfer condenser." The two plates B34 are connected with each other, as schematically indicated by a dash-dotted line, and together in dependency of a switch B38 connected to one pole of a high-frequency generator B35, the other pole of which is connected to earth. B36 designates connecting conduits to the plate B34. The plates are secured at the stand B6 by insulating stays B37 (not shown in FIG. 5).

Figure 7:
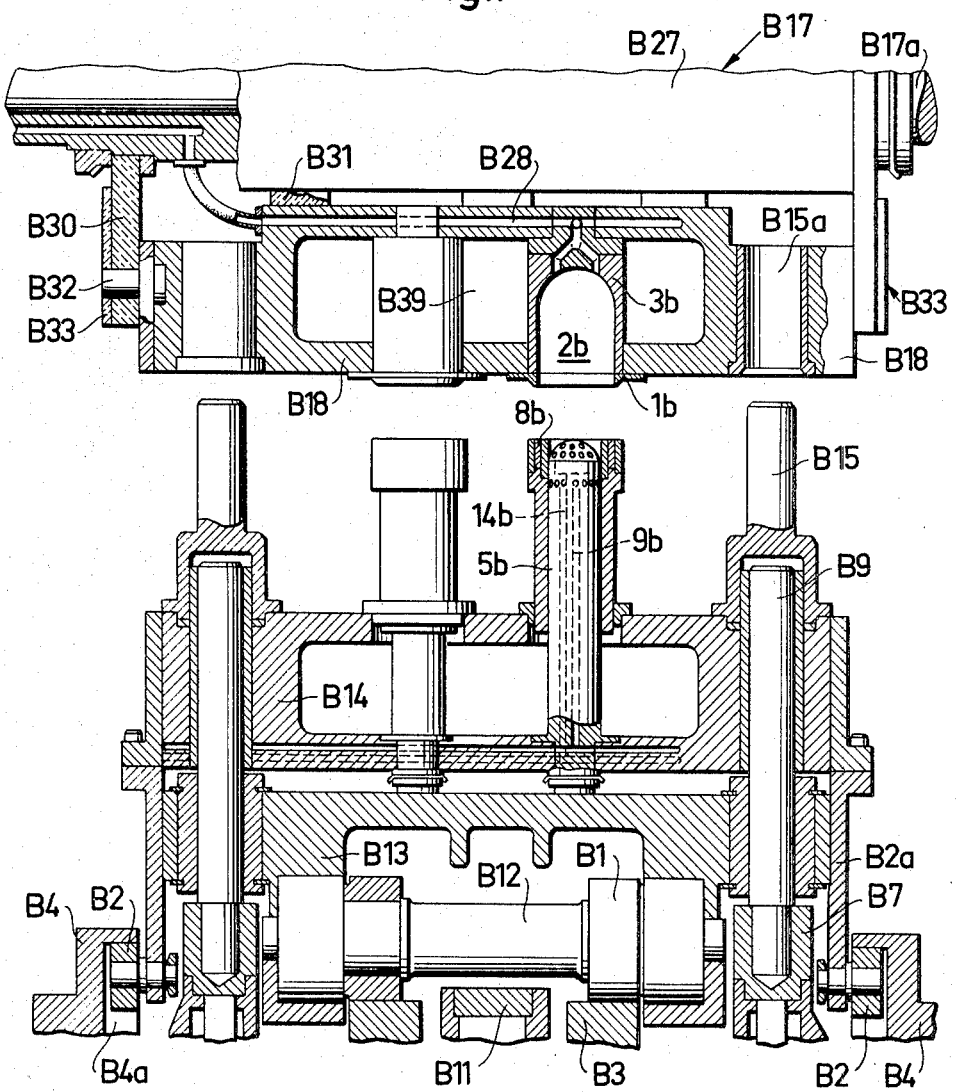
FIG. 7 shows a vertical section through members for moulding the bottom portions.

The moulding boxes B18, further, comprise guide sleeves B15a adapted to receive the guide pins B15, FIG. 7. It is understood that the controls of the two revolving means T17 and B18 are independent of each other and not intended for co-operation in the welding position.

Figure 11:
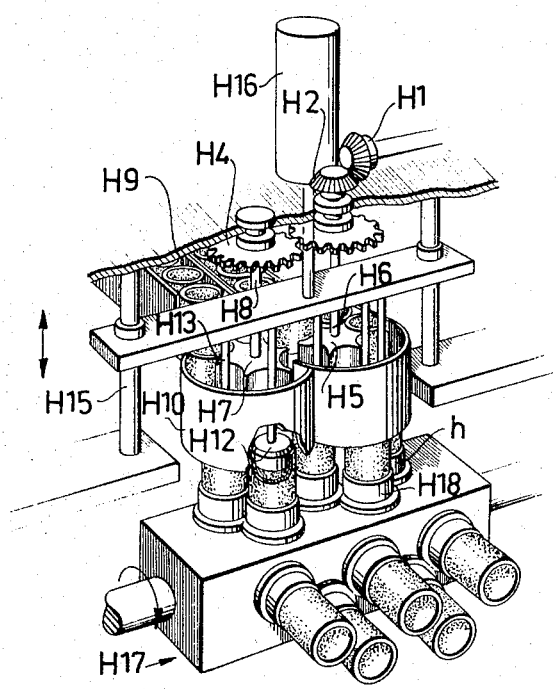
FIG. 11 shows how the sleeves for stiffening the bottom portion are intended to be moved forward and applied in their holders.

FIG. 11 shows in a greater detail the construction of the means for inserting the sleeves. The said means can be said to consist of two units, viz a sleeve feeder HF, FIG. 5 and a sleeve receiver in the form of a revolving cross H17.

The said sleeve feeder comprises two grooves H9 wherein the sleeves $h$ can slide forward. At the beginning of the grooves H9 a conveying means (not shown) is arranged, for example in the form of an endless web, by which the sleeves are advanced in the grooves H9. Above the revolving cross H17, the grooves H9 transform into two sector elements H10 wherein the sleeves are intended to be fed by the planetary pinions H5 and H7 to a position for being moved down in the sleeve holders H18 on the revolving cross H17. The said planetary pinions are of such a design, and the power transfer means are arranged such to be able to rotate the planetary pinions in such a manner, that the axis of the sleeves are made to coincide with those of the sleeve holders H18.

The said power transfer means comprise two bevel gears H1, H2 driving two gear wheels H3 and H4 having the division ratio 2:3. When, thus, the planetary pinion H5 via the shaft H6 is turned three steps in clockwise direction, the planetary pinion H7 via its shaft H8 simultaneously is turned forward two steps in the anti-clockwise direction. Hereby three and two sleeves respectively are fed to the position for being inserted in the sleeve holders H18.

The downfeed of the sleeves is intended to be carried out by the devices H12 which via the rods H13 are secured to a plate H14. The said plate H14 is adapted to be moved down with the help of a piston H16 and is mounted on the rods H15.

Figure 12:
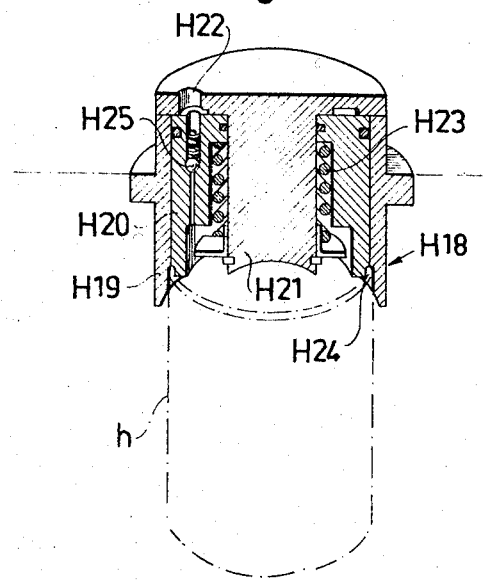
FIG. 12 shows a sleeve holder in a sectional view.

FIG. 12, fiinally, shows in a perspective view the section of a sleeve holder H18 with a sleeve h retained therein. The sleeve holder H18 has two functions, namely, to hold the sleeve h during its rotation in the revolving cross H17, and to roll up the edge r, FIG. 1.

A sleeve holder H18 can be said to consist of three main parts, namely, an outer piece H19, an intermediate piece H20 and a central piece H21. The intermediate piece H20 on the one side and the two remaining pieces on the other side are movable relative one another. For rolling up the edge r, an enlarged annular groove H24 is provided in the outer piece H19 and in the intermediate piece H20, said groove allowing the container bodies tb, FIG. 8 to be moved up into the sleeves h a distance somewhat longer than to the contact between flanges $f_2$, FIGS. 1 and 4, and the lower edge of the sleeves h, which results in the desired rolling up in the groove H24, FIG. 12.

The ejection of the completed bottles tbh is intended to be carried out with the help of the intermediate piece H20 which, as mentioned, is movable relative the remaining parts in the sleeve holder. The said motion is effected by compressed air, for which purpose the conduit H22 is connected to a compressed air source. For the return of the intermediate piece H20 a spring H23 is provided. H25 designates a check valve which opens when the conduit H22, instead of being connected to a compressed air source, is connected to a vacuum source whereby the bottles can be retained by suction in the sleeve holder. This possibility is utilized when the container bodies tb are being delivered from the revolving means T17.

Though being obvious for a person skilled in the art, it nevertheless is explained in the following how the machine described with reference to FIGS. 5-12 is supposed to operate.

A working cycle can be said to be completed when the revolving crosses just have been brought to a standstill, and the material webs are advanced one step. In this moment, the hydraulic boxes T14 and B14, FIGS. 6 and 7, are in their bottom positions, the guide pins B15 are drawn out of the bushings B15a, the shafts of the revolving crosses are idle, the moulding box T18a, FIG. 8, passes the starting position for being combined with the box B18a, and the moulding box T18b passes the starting position for inserting the container bodies tb into the sleeves h.

A new working cycle is commenced in that the continuously rotating shafts T5 and B5 start a new revolution. Hereby, the cam discs T3 and B3 actuate the rolls T1 and B1 respectively, by the rotation of the shafts T5 and B5, in such a manner, that the said rolls are moved upwards. The hydraulic box T14 and thereby the mandrels T16 are moved upwards against the moulding box T18, FIG. 6 via the shaft T12 and the beam T13. In a corresponding way, the mandrels B16 are moved upwards against the moulding box B18, FIG. 7.

The pillars T9 and B9 rest on the supports T7 and B7 respectively and, consequently, do not take part in the movement. Thus, the hydraulic box T14 slides over onto the guide pins T15 which slide into the bushings B15a, thereby giving especially the welding operation, FIG. 10, the precision required. In the manner described in connection with FIGS. 2 and 3, the material portions located between the mandrels and the moulding boxes are pressed in, and the top and bottom portions are moulded to the desired shape. The rounds punched out by the forming of the bottle openings fall down through the channels T40 and are transported away on the "slide" T42.

The upward movement of the hydraulic box T14, as mentioned, is effected with the help of the cam discs T3 mounted on the shaft T5. On the same shaft two cam discs T4 are mounted which, consequently, also are rotated. By a suitable design of the guide grooves T4b, FIG. 9a, the pins T22 running in said grooves displace the rods T24, so that the cam discs T19 with the revolving shaft T17a being mounted therein are turned through a certain angle of rotation in the desired direction. The revolving shaft, however, still remains idle, because its rotation during this first phase of the working cycle is counteracted by the braking of its drive means and by the fact, that the bushings T9a slide over onto the guide pins T15 and effectively prevent any disturbing of the revolving cross.

In the revolving cross T17, however, the moulding boxes T18 are displaceable also during the said phase. Due to the fact, that the cam disc T19 is turned through a certain angle of rotation and the revolving cross T17 remains idle, the moulding boxes are guided by their end wall rolls T20 off the cam groove T21. The portion of the cam T21 located in connection to the moulding box T18a, for example, is shaped such, that the moulding box is moved outwards in radial direction, so that the top portions t are moved the short distance from the starting position for being welded together to the abutment against the bottom portions.

The portion of cam T21 located in connection to the moulding box T18b, FIG. 8, is given a somewhat steeper shape, thereby being able to move the moulding box the relatively great distance required for moving up the container bodies tb in the sleeves h, and at the end of said movement by an excessive displacement to effect the rolling up of the edges r of the sleeve, FIGS. 1 and 12.

The lower moulding box T18, with the revolving cross T17 standing idle, abuts all the time to the shaft T17a of the cross.

When the top portions t and the bottom portions b with their edge flanges $f_1$ and $f_2$ respectively are brought into contact with each other, and the edge flanges are pressed together by the welding electrodes 1t and 1b, the welding operation takes place, FIG. 10. This is effected by operating the switch B38 whereby via the lines B36, plates B33 and B34, connections B32, moulding box B18a and the welding electrodes 1b, electric high-frequency current is directed over to the welding electrodes 1t and therefrom to earth. Hereby the flanges pressed together between the electrodes 1t and 1b are heated, so that they fuse together and by action of the spring washers 3t, FIG. 2, are formed in the way described.

The welding being completed, the switch B38 disconnects the current supply. The operation time is determined by a timing unit (not shown) which may be of conventional type. The moulding boxes T18a and B18a, however, still must remain combined for a short moment, or until the welds have stabilized.

Figure 9A:
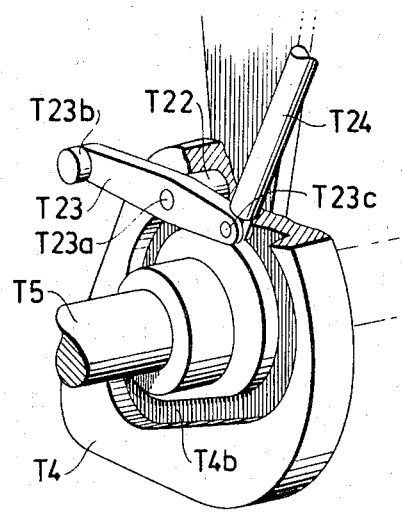
FIGS. 9a and 9b show in a greater detail the design of a guide cam disk according to FIG. 5.
Figure 9B:
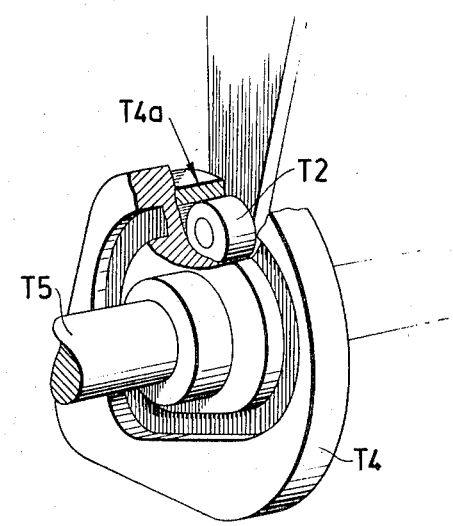

During the welding time the cam disc T19 stands idle, but is thereafter again drawn down by the cam disc T4, FIG. 9a. Hereby the moulding box T18a again is moved back, and at the same time the air line B28, FIG. 10, is connected to a pressure source, so that the bottom portions are pushed out of the moulding cavities. The line T28, FIG. 10, still is connected to a vacuum source. By the separation of the moulding boxes and by the simultaneous ejection and suction, the container bodies formed and welded together are caused to follow with the top moulding box T18a, FIG. 10.

At the same time the moulding box T18b, FIG. 8 again is drawn down in the corresponding way, after having pushed in the container bodies tb into the sleeves h. In connection with the said downward movement the air conduit T28 is connected to a pressure source, thereby ensuring the delivery of the container bodies to the sleeves. This is effected in that the space between the bottom portion b and the sleeve h is connected to a vacuum source which is shown with reference to FIG. 12.

At about the same time when the welding is completed and the rolling up of the edges r is effected, the hollow bodies are finally shaped in the lower moulding boxes, and the hollow bodies are punched out of the plastic materials Ft and Fb. Hereafter the cam grooves T4a FIG. 9a, and B4 become active and draw down the hydraulic boxes T14 and B14 respectively. The return movement is facilitated by the own weight of the hydraulic boxes.

During the idle period of the revolving crosses a new set of sleeves is introduced into the sleeve holders H18, FIG. 11, in that the devices H12 are moved down and thereby press in the sleeves into the sleeve holders. At the same time, the air line H22 is connected for a short time to a pressure source, FIG. 12, whereby in the aforedescribed manner completed bottles are ejected from the sleeve holders which, with reference to FIG. 5, are facing the rear side of the machine. The bottle ejected are received by means (not shown) arranged for this purpose, and transported away.

The first phase of a working cycle can be said to be finished when the container bodies entirely are drawn out of the bottom moulding box B18a, FIG. 10, the moulding box T18b, FIG. 8, is drawn back so that the packing containers tbh with their top portions t entirely are out of the top moulding cavities, the hydraulic bodies with their mandrels are returned, new sleeves are inserted in the sleeve holders and the completed bottles are ejected.

The next phase of the working cycle is commenced in that the revolving cross shafts T16a, B17a and H17a are started to rotate. At the same time as the revolving crosses are turned, the preheated plastic material webs Ft and Fb are advanced one step corresponding to the demand of one set of container bodies, i.e. for five top portions and five bottom portions. The waste material is collected in collecting means arranged for this purpose in the space between the stands T6 and B6. The means for heating the plastic materials for stepping the webs and for the collection of the waste material are not shown in the figures, in order not to overload them. The said means, however, may be of a nature known to the man skilled in the art.

During the rotation of the revolving crosses also a new set of sleeves is advanced, with the help of means described with reference to FIG. 11. The way in which this feed is effected appears with desired clearness from the figure and from the foregoing description and, therefore, is not repeated in this connection.

During this phase all three of the revolving crosses are turned through one quarter of a revolution in the directions of the rotation arrows. Hereby a bottom moulding box with a set of newly manufactured bottom portions is fed to the position for welding, the said bottom portions still being hot and, thus, prepared for being welded together.

In a corresponding manner a set of newly manufactured top portions is advanced in its moulding box, in synchronization with the bottom portions. As, however, the top moulding boxes T18 are adapted to slide in the manner described, the said moulding box, by a suitable design of the cam groove T21, also is displaced radially. Upon the completion of the rotation of the revolving cross T17 through 90 degrees, the so-called indexing motion, the moulding box T18a, FIG. 8, passes the said starting position for combining and welding together the hollow bodies.

The top moulding box comprising the top portions newly united with the bottom portions, transports the container bodies tb upwards to a starting position for being inserted into the sleeves h.

The top moulding box having newly delivered its container bodies, is turned to a nonoperative position, from which position the fourth top moulding box is turned to the lower position, i.e. to a starting position for the moulding of new hollow bodies.

The way in which the bottom moulding cross B17 is continued to step forward, and also the way of stepping ahead the sleeve cross H17 need no special explanation. It is merely referred to FIG. 5 which with desired clearness shows the function of the said means.

When the turning through 90 degrees is completed and the revolving crosses are brought to a standstill, the working cycle is finished. All means are now in their starting positions.

The invention, of course, is not restricted to the embodiments described above, but may be modified within the scope of the following claims. Thus, the arm crosses supporting the moulding tools may, of course, be provided with any optional number of arms which, of course, need not be the same in number on the different crosses. Furthermore, the invention is not restricted to an arrangement for moulding only plastic material, but it has proved possible in the same arrangement also to manufacture hollow bodies of, for example, aluminum. In the latter case, the welding method, of course, must be adjusted to the material.

The movement of the arm crosses realtive to one another, as also the movement of the moulding tools preferably is controlled by cams, but there is, of course, a plurality of ways in which these problems can be solved, such as, for example, by an extensive hydraulic operation.

As explained at the introductory part of this specification, the apparatus as disclosed in FIGS. 2 through 12 can be modified to convert its operation from handling two-part container bodies such as shown in FIG. 1 to handling a one-part container body having a cyindrical configuration, the container body being moulded with an open top and transferred directly to and into the outer stiffener sleeve.

Figure 13:
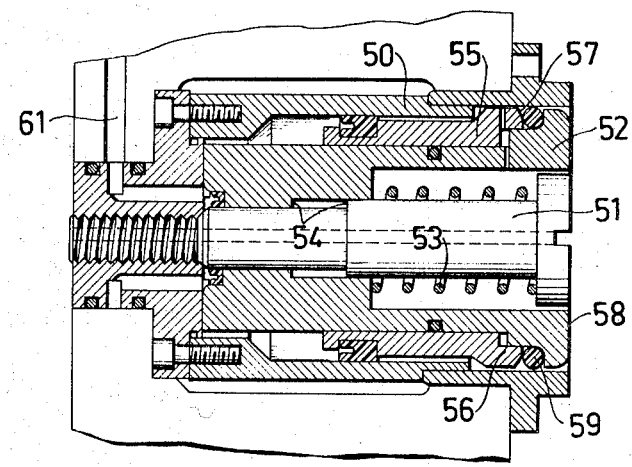
FIGS. 13 and 14 show, in longitudinal section, one suitable type of gripping means which is to be used in modifying the apparatus shown in FIGS. 2 through 12 to handle the moulding of one-piece type liners or container bodies and their insertion into the outer and relatively stiff sleeves.
Figure 14:
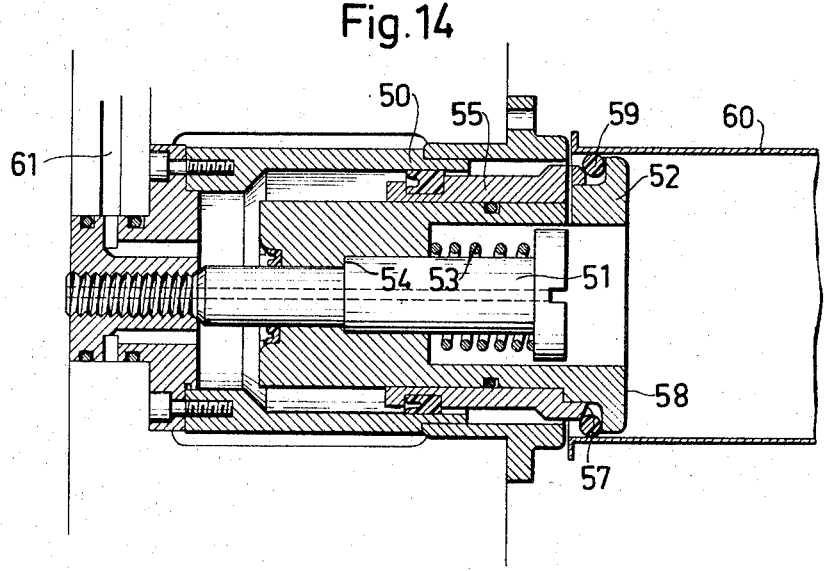

In this modification, the revolving cross T17 instead of being equipped with moulding devices 3t with moulding cavities 2t is equipped with gripping and transfer devices as shown in FIGS. 13 and 14, which function to remove the one-piece container bodies from the revolving cross B17 and transfer them to and into the outer stiffener sleeves h on the revolving cross H17.

More particularly, as shown in FIGS. 13 and 14, which shows the details of construction of one of the gripping and transfer devices located on the revolving cross T17, a cylinder 50 is provided having a central guide pin 51, along which an inner piston 52 is capable of displacement against the force of a spring 53 until piston 52 has reached a position such that stops 54 are brought together and further movement of piston 52 is not possible.

Outside the inner piston 52 there is situated an outer piston 55 which consists principally of a largely cylindrical component which is able to move freely between the walls of cylinder 50 and the outside of the inner piston 52, the front edge 56 of which has a chamfered portion 57. Between the front portion 58 of the inner piston 52 and the front edge 56 of the outer piston 55 there is a ring-shaped component 59 made from an elastic material, e.g. rubber.

When the gripping and transfer device is to be brought into engagement with a moulded container body 60 which may have the same configuration as the bottom portion b of the two-part bottle shaped container body shown in FIG. 1, it is first positioned centrally in front of the forming cavity of the container body 60, after which a pressurizing agent, preferably compressed air, is introduced through the duct 61. As is shown in FIG. 14 the inner piston 52 will be pushed forward against the action of spring 53 to a position where the stops 54 are brought together. By this means, the front portion 58 of the inner piston 52, together with the ring-shaped component 59, will be inserted into the opening of the container body 60.

Since the outer piston 55 will also be effected by the pressurized agent introduced into cylinder 50, piston 55 will be displaced forwards, causing the chamfered edge 57 at the front portion of piston 55 to be pressed against the elastic ring-shaped component 59, which will expand to take up the position shown in FIG. 14 as a result of this force.

In this position, the expanded ring 59 will be pressed against the inside of the container body 60 which will be held firmly by ring 59. When the cross T17 is caused to move in such manner that the gripping device is withdrawn from the forming cavity in the cross B17 in which the container part 60 was moulded, the container part 60 will be withdrawn from its cavity, after which the container part 60 while being held firmly by the gripping device, will be transferred to the sleeve fitting station H17 where the container part 60 will be brought into a position centrally in front of a sleeve h where the container part 60 will then be inserted into the sleeve as a result of relative movement between the sleeve h and container part 60.

After the container part 60 has been inserted into sleeve h, and the assembly of the container part and sleeve thus formed has been transferred to an outfeed or storage station, the inside of cylinder 50 is brought into contact with atmospheric pressure which causes the spring action of the expanded ring 59 to push back the outer piston 55 so that ring 59 can take up a position between the front portions 56, 58 of pistons 55 and 52 respectively, in which position the diameter of the ring 59 will be smaller. By virtue of the fact that the diameter of ring 59 has become smaller, the hold on container part 60 is also released, and is let go. Piston 52 is caused to move back to the position shown in FIG. 13 by the action of spring 53, and when all the components have been moved back into the original positions, the device is ready for a new cycle of operations.

I claim:

1. Apparatus for producing containers having a plastic lining at least a part of which is disposed within a sleeve of relatively stiff material comprising at least one forming means including at least one forming unit having at least one forming cavity therein, at least one forming mandrel cooperating with the at least one cavity, at least one shaft, said at least one forming unit being mounted thereon, means for intermittently rotating said at least one shaft about the axis of said at least one shaft to position said at least forming unit at a plurality of consecutive stations, said at least one forming mandrel being at one of said stations, means for positioning a blank of heated plastic material between said at least one forming unit and said at least one mandrel when in aligned position at one of said stations, means for displacing said at least one mandrel into the at least one forming cavity to shape the blank of plastic material to conform with the at least one forming cavity, means for reducing pressure inside said at least one forming cavity on the outside of the blank of plastic material, means communicating with the outer surface of said at least one mandrel for increasing pressure inside the blank of plastic material to cause the plastic material to conform closely with the shape of the at least one forming cavity, means for withdrawing said at least one mandrel from the at least one forming cavity while retaining the shaped plastic material therein, means for rotating said shaft and said forming means to an advanced station, means for positioning at least one sleeve of relatively stiff material in alignment with the shaped plastic material retained in the at least one forming cavity at the advanced station and means for transferring the shaped plastic material from said at least one forming unit to the at least one sleeve to form the container.

2. Apparatus as claimed in claim 1 wherein said at least one forming means comprises a plurality thereof spaced circumferentially about said at least one shaft, each forming means including at least one forming unit with at least one forming cavity facing outwardly from said at least one shaft, each forming unit being arranged about said at least one shaft so as to be positioned at each of the plurality of consecutive stations.

3. Apparatus as claimed in claim 1 wherein said at least one forming means comprises two such means, each of said forming means including at least one forming unit having at least one forming cavity therein, at least one forming mandrel for cooperating with the forming cavities and two shafts, each of said at least one forming unit being mounted on one of said shafts whereby said forming units are rotatable intermittently with each shaft and further comprising means for forming flange elements at the outer peripheral edge of each shaped plastic material, means for rotating each of said shafts to a station at which the respective flange elements of two formed plastic linings are aligned and means for uniting the flange elements together while each plastic lining remains in its respective forming cavity to form a single plastic lining unit.

4. Apparatus as claimed in claim 3 wherein each of said forming mandrels comprises means for clamping the blank of plastic material about the edge of the forming cavity in said forming unit and plunger means for pressing the blank of plastic material into the forming cavity thereof.

5. Apparatus as claimed in claim 4 wherein one of said forming mandrels is provided with a passage for introducing fluid pressure into the heated blank of plastic material to cause it to stretch and conform to the forming cavity and is further provided with a plurality of air passages for supplying heated air to the front surface of said forming mandrel to reduce stretching friction between said mandrel and the heated blank of plastic material being stretched.

6. Apparatus as claimed in claim 3 wherein each forming means comprises four groups of said at least one forming unit each unit having at least one forming cavity, each group being mounted on its respective shaft, each group of the at least one forming cavity being at 90° from the adjacent groups of at least one forming cavity, the longitudinal axes of each forming unit being normal to the axis of its respective shaft and further comprises means for intermittently rotating said shafts so as to position each of said at least one forming unit in succession in alignment with each of said at least one forming mandrel for cooperation with the at least one forming cavity therein.

7. Apparatus as claimed in claim 6, each forming unit comprises a forming box including a plurality of identical forming units.

8. Apparatus as claimed in claim 7 wherein the two shafts rotate about parallel axes in opposite directions and are spaced so that the axes of the forming cavities of said plurality of forming units will, at one station be coaxial with the axes of the forming cavities of the other plurality of forming units and further comprising means for bringing together the opposed forming cavities having shaped plastic linings therein and means for welding the opposed flange elements together.

9. Apparatus as claimed in claim 8 wherein the means for bringing opposed cavities together comprises means operable during the rotational movement from the preceeding station to the one station for moving one of said forming units radially outwardly from its associated shaft and means when said opposed cavities have stopped at said one station, for continuing said radial outward movement to bring the opposed shaped plastic linings in said cavities into abutting relation and means for welding said opposed flanges together, said welding means being associated with said forming units.

10. Apparatus as claimed in claim 9 wherein the means operable during the rotational movement comprises a rotatable cam and a pivot affixed to each forming box operable by said cam.

11. Apparatus as claimed in claim 9 wherein the means for continuing said radial outward movement further comprises means for rotating said rotatable cam when said opposed cavities have stopped at said one station.

12. Apparatus as claimed in claim 11 and further comprising a second rotatable cam operably connected to said means for rotating said first mentioned cam when said opposed cavities have stopped at said one station.

13. Apparatus as claimed in claim 6 and further comprising cam means for moving said forming mandrels into the respective cavities of said forming units when said mandrels and cavities are in alignment.

14. Apparatus as claimed in claim 6 and further comprising additional cam means for withdrawing said forming mandrels from the respective cavities of said forming units after forming the shaped plastic lining.

15. Apparatus as claimed in claim 12 and further comprising cam means for moving said forming mandrel into the cavities and cam means for withdrawing said forming mandrel from the cavities, and a common shaft for both of said cam means and for said second rotatable cam operably connected to said first mentioned cam.

16. Apparatus as claimed in claim 8 wherein one of said forming means forms the bottom body portions of the containers and the other of said forming means forms the top portions of the containers and further comprising means for releasing the bottom body portions from their respective cavities after welding said opposed flange portions together while the respective forming units are being rotated to the next consecutive station, said bottom body portion being retained by the top portion.

17. Apparatus as claimed in claim 16 and further comprising means for moving the forming unit carrying the top portions and the bottom body portions welded thereto and for moving the means for positioning the at least one sleeve of relatively stiff material, toward each other when aligned at the next consecutive station so that the bottom body portion of the container will be inserted in said sleeve.

18. Apparatus as claimed in claim 17 wherein the means for moving the forming unit toward the means for positioning the at least one sleeve is associated with the means for bringing together the opposed forming cavities having shaped plastic linings therein.

19. Apparatus as claimed in claim 17 wherein the means for positioning the at least one sleeve includes means having an annular groove whereby the edge of said sleeve which forms the bottom of the completed container is rolled peripherally inwardly and upwardly to strengthen the base of the container when the bottom body portion of the container is inserted in said sleeve.

20. Apparatus as claimed in claim 8 wherein the means for welding the opposed flange elements together comprises electrodes on said opposed forming units adapted to engage the flange elements when said forming units are brought together, a high frequency generator, a capacitor, circuit means connecting one side of said generator through said capacitor to the electrodes on said forming units, the other side of said generator and the electrodes on the opposed forming units being grounded.

21. Apparatus as claimed in claim 20 wherein said electrodes are integrally formed with the forming units.

22. Apparatus as claimed in claim 4 and further comprising hydraulic means for operating said clamping means and for cooling said plungers.

23. Apparatus as claimed in claim 3 wherein one of said forming means includes means for punching an opening in the top of the shaped plastic material to provide an orifice in the top of the completed container.

24. Apparatus as claimed in claim 23 and further comprising springs compressible by said punching means.

25. Apparatus as claimed in claim 19 and further comprising a source of compressed air for ejecting the container from the sleeve positioning means after the plastic lining has been inserted therein.

26. Apparatus as claimed in claim 19 and further comprising a source of vacuum for retaining the container in the sleeve positioning means after the plastic lining has been inserted therein.

References Cited

UNITED STATES PATENTS

| | | | |
|---|---|---|---|
| 1,624,849 | 4/1927 | Steele et al. | 18—21X |
| 2,478,812 | 8/1949 | Drake | 18—21X |
| 2,497,212 | 2/1950 | Donofrio | 18—21X |
| 3,549,123 | 4/1951 | Osterhof | 18—21X |
| 3,049,801 | 8/1962 | Workman | 29—234X |
| 3,073,016 | 1/1963 | Drake | 29—235X |
| 3,170,231 | 2/1965 | Gleason | 29—208 |
| 3,235,639 | 2/1966 | Knowles | 18—19FX |

THOMAS H. EAGER, Primary Examiner

U.S. Cl. X.R.

18—19